United States Patent [19]

Okamoto

[11] Patent Number: 4,892,384
[45] Date of Patent: Jan. 9, 1990

[54] BINOCULAR MAGNIFIER

[75] Inventor: Zenjiro Okamoto, Hyogo, Japan

[73] Assignees: Kabushiki Kaisha AG, Osaka; Zenjiro Okamoto, Hyogo, both of Japan

[21] Appl. No.: 80,340

[22] Filed: Jul. 31, 1987

[30] Foreign Application Priority Data

Aug. 27, 1986 [JP] Japan ................. 61-130520

[51] Int. Cl.⁴ .................... G02B 25/00; G02C 7/02
[52] U.S. Cl. ............................. 350/145; 351/175
[58] Field of Search ............... 350/145, 144; 351/175, 351/110

[56] References Cited

U.S. PATENT DOCUMENTS

| 439,130 | 10/1980 | Edmunds | 351/175 |
| 701,788 | 6/1902 | Berger | 351/175 |
| 1,092,769 | 4/1914 | Hubbell | 351/110 |
| 1,099,404 | 6/1944 | Spery | 351/110 |
| 1,530,240 | 3/1925 | Crawford | 351/175 |
| 1,636,450 | 7/1927 | Ames, Jr. | 350/145 |
| 4,429,951 | 2/1984 | Hirano | 350/144 |

FOREIGN PATENT DOCUMENTS

| 3113077 | 2/1983 | Fed. Rep. of Germany | 351/175 |
| 1145065 | 10/1957 | France | 350/145 |
| 446129 | 3/1949 | Italy | 351/175 |
| 3101 | 11/1862 | United Kingdom | 350/145 |
| 661194 | 11/1951 | United Kingdom | 350/144 |
| 783315 | 9/1957 | United Kingdom | 350/145 |

OTHER PUBLICATIONS

Adams et al., "Visual Performance and Optical Properties of Fresnel Membrane Prisms", American Journal of Optometry, vol. 48, Apr., 1971, No. 4, pp. 289-297.

Primary Examiner—Bruce Y. Arnold
Assistant Examiner—Terry S. Callaghan
Attorney, Agent, or Firm—Wolf, Greenfield & Sacks

[57] ABSTRACT

A binocular magnifier which has a convex lens for the right eye retained in front of the right eye and a convex lens for the left eye retained in front of the left eye. The convex lens for the right eye is disposed eccentrically in such a manner that the optical axis of the lens is parallel to the visual axis of the right eye in the short-distance working region and located on the side of the visual axis of the right eye which is closer to the left eye. The convex lens for the left eye is disposed eccentrically in such a manner that the optical axis of the lens is parallel to the visual axis of the left eye in the short-distance working region and located on the side of the visual axis of the left eye which is closer to the right eye. The two convex lenses are spliced together in one unit at the median position between the right and left eyes. Accordingly, it is possible to obtain excellent binocular vision without any fear of the eyes becoming fatigue even when the magnifier is used for a long period of time.

4 Claims, 3 Drawing Sheets

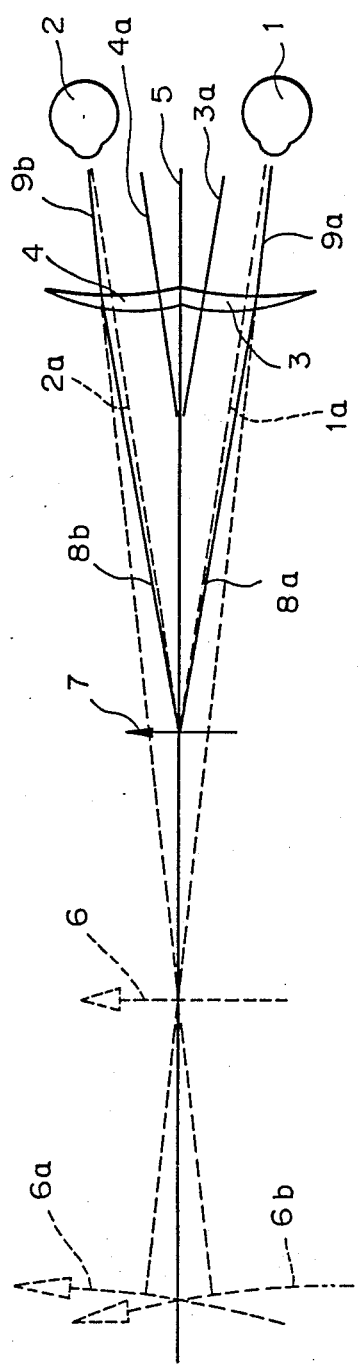
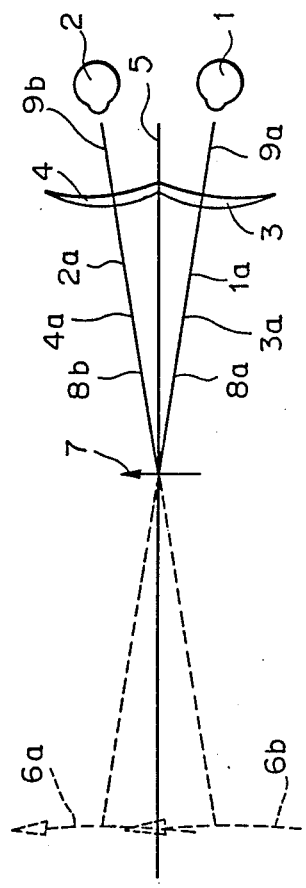
Fig. 1
Fig. 2

BINOCULAR MAGNIFIER

BACKGROUND OF THE INVENTION

1. Field of the Invention

The present invention relates to a binocular magnifier which is mainly used by a weak-sighted person to obtain excellent binocular vision.

2. Description of the Related Art

Glasses and magnifiers for weak-sighted persons which have lenses for correcting weak eyesight impart an effective viewing function to weak-sighted persons who can read relatively large letters or the like but cannot read relatively small letters or the like.

Such glasses for weak-sighted persons include monocular and binocular types, and in order to obtain a high magnifying power it is general practice to employ telescope type glasses that utilize a combination of two or more lenses.

The conventional binocular glasses for weak-sighted persons suffer, however, from various problems such as a narrow field of view, a short working distance, a heavy weight due to the structure in which two or more lenses are combined together in one unit using a lens tube, and an inferior appearance in use. Further, since glasses for weak-sighted persons require an eye examination for each individual user, orders therefor cannot readily be fulfilled. For these reasons, magnifiers are generally employed to obtain magnified images with ease. Magnifiers provide a relatively wide field of view and a sufficiently long working distance. However, when binocular vision is effected using a single magnifier, various problems are experienced. More specifically, since the right and left eyes have different fields of view inside the lens and since the fields of view inside and outside the lens of the right and left eyes overlap each other, the visual axes oscillate, so that the process of obtaining a fusion image by convergence and accommodation which constitute the binocular vision function becomes considerably unstable.

Vergence is the function to concentrate the visual axes of the right and left eyes on an object by turning the eyes inwardly.

Accommodation is the function to form the image of an object on the retina by varying the curvature of each crystalline lens in accordance with the distance between the retina and the object.

Fusion is the phenomenon that visual impressions on the retinae of the right and left eyes are superposed one upon the other by the eye movement to thereby form one impression.

Accordingly, employment of a magnifier for binocular vision forces the user to make considerable efforts, and it is therefore difficult to use a magnifier for a long period of time.

SUMMARY OF THE INVENTION

In view of the above-described circumstances, it is a primary object of the present invention to provide a binocular magnifier which enables excellent binocular vision to be obtained without any fear of the eyes becoming fatigued, even when the magnifier is used for a long period of time.

To this end, the present invention provides a binocular magnifier comprising: a convex lens for the right eye retained in front of the right eye, the convex lens for the right eye being disposed eccentrically in such a manner that the optical axis of the lens is parallel to the visual axis of the right eye in the short-distance working region and located on the side of the visual axis of the right eye which is closer to the left eye; and a convex lens for the left eye retained in front of the left eye, the convex lens for the left eye being disposed eccentrically in such a manner that the optical axis of the lens is parallel to the visual axis of the left eye in the short-distance working region and located on the side of the visual axis of the left eye which is closer to the right eye, the two convex lenses being spliced together in one unit at the median position between the right and left eyes.

By virtue of the above-described arrangement in which the convex lenses for the right and left eyes are spliced together in one unit and no lens frame is used, it is possible to ensure a wide field of view and enable the process of binocular vision, from vergence and accommodation to fusion, to be performed considerably smoothly.

Since the convex lenses for the right and left eyes are disposed so as to be eccentric inwardly, the fusion image can be seen at a position which is more remote from the working distance by virtue of the prism action that occurs at the peripheral edge portion of each convex lens. The working distance means the distance from the eyes to a representative position within the working region. The maximum distance in the working region is a length obtained by adding the focal length of a lens to the distance from the corresponding eye to the lens, while the minimum distance in the working region is considered to be about 10 cm from the eye as the limit in the range within which an actual work can be conducted. Accordingly, even in the case where lenses having a relatively high refracting power are used and the working region is extremely closer to the eyes than the distance of distinct vision, the fusion image can be located at the distance of distinct vision and therefore it is possible to perform vergence without any uncomfortableness.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like members and, of which:

FIG. 1 is a plan view of an optical system employed in the binocular magnifier according to the present invention;

FIG. 2 is a plan view of an optical system in which the lenses are not disposed eccentrically;

DESCRIPTION OF THE PREFERRED EMBODIMENT

Figure 3:
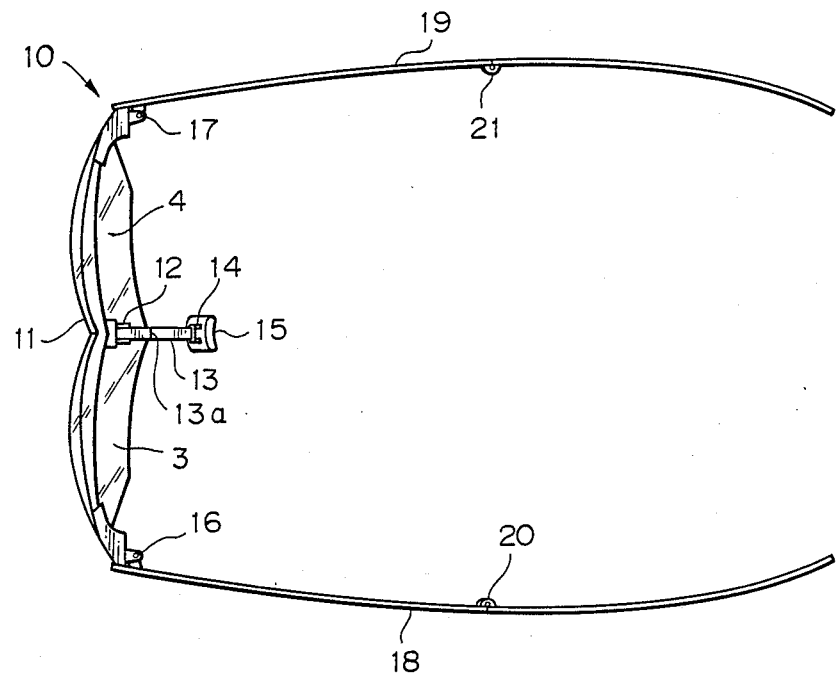
FIG. 3 is a plan view of one embodiment of the binocular magnifier according to the present invention.
Figure 4:
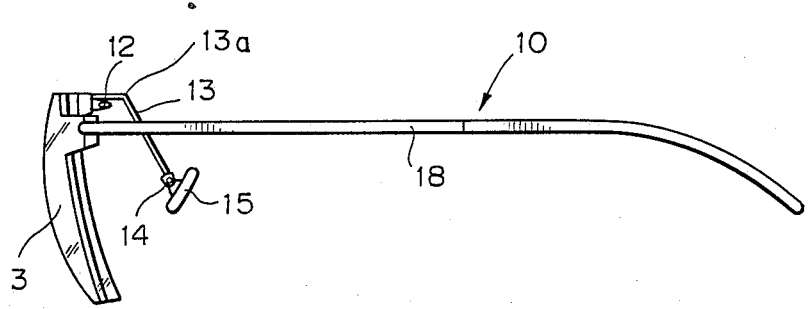
FIG. 4 is a side view of the binocular magnifier shown in FIG. 3.
Figure 5:
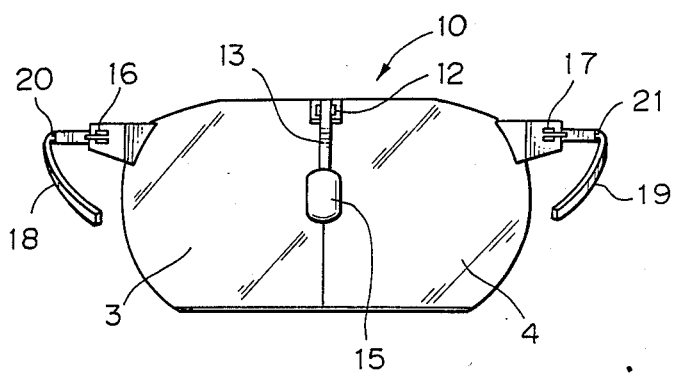
FIG. 5 is a side view of the binocular magnifier shown in FIG. 3 as viewed from the right-hand side thereof.

One embodiment of the present invention will be described hereinunder in detail with reference to the accompanying drawings.

Referring first to FIG. 1, which shows the principle of the binocular magnifier according to the present invention, the reference numerals 1 and 2 denote the left and right eyes, respectively. A meniscus convex lens 3 for the left eye and a meniscus convex lens 4 for the right eye are spliced together in one unit along a plane which passes through a median axis 5 between the left and right eyes 1, 2, and the optical axis 3a of the lens 3 and the optical axis 4a of the lens 4 are parallel to the visual axis 1a of the left eye 1 and the visual axis 2a of the right eye 2, respectively. More specifically, the lenses 3 and 4 are disposed in such a manner as to be eccentrical toward the axis 5 by the same distance, and the optical axes 3a and 4a are at the same angle with respect to the axis 5. The term "visual axes" means lines which cross each other at an object 7 located at a representative position within the working region.

When the object 7 is seen through the lenses 3 and 4, the image of the object 7 enters the eyes 1 and 2 through optical paths 8a, 8b, 9a, 9b. At this time, the optical paths 8a and 8b undergo a prism action when passing through the peripheral edge portions of the lenses 3 and 4, resulting in the optical paths 9a and 9b being deflected toward the axis 5. As a results the visual axes 1a and 2a deflect outwardly of the optical paths 8a and 8b as the prolonged lines of the optical paths 9a and 9b so that a fusion image 6 is seen at a position which is remoter than the object 7. In FIG. 1 the reference numeral 6a denotes the image seen by the left eye 1, while the numeral 6b denotes the image seen by the right eye 2.

FIG. 2 shows an optical system in which the lenses 3 and 4 are not disposed eccentrically toward the axis 5. In this optical system, the visual axes 1a and 2a are coincident with the optical axes 3a and 4a, respectively, and therefore there is no deflection of the optical paths 9a and 9b that occurs in the optical system shown in FIG. 1.

The amount of eccentricity of the optical axes 3a and 4a which is needed to cause a necessary deflection of the optical paths may be obtained from the following formula which is known as the Prentice' formula:

$$\tan \delta = \frac{h \cdot D}{1000}$$

where $\delta$: angle of deflection (unit: degree)

h: amount of eccentricity (unit: millimeter)

D: refracting power of lens (unit: diopter)

For example, if a lens having a refracting power of 4 diopter is used and the working distance and the distance of distinct vision are assumed to be 20 cm and 30 cm, respectively, the amount of eccentricity is determined to be 12 mm for each of the left and right lenses 3 and 4. However, the results of the experiment carried out with a binocular magnifier made on a trial basis which was arranged so that it was possible to vary the amount of eccentricity showed that the majority of the subjects of the experiment found it comfortable to use the binocular magnifier having an amount of eccentricity set so as to be a half or third of the calculated value. Accordingly, it is considered that the amount of eccentricity should not be obtained on the basis of geometrical optics only but it must be corrected from the viewpoint of physiological optics.

FIGS. 3 to 6 show in combination a practical arrangement of the binocular magnifier according to the present invention. The binocular magnifier 10 has lenses 3 and 4 having the optical axes 3a and 4a made eccentric toward the axis 5 as shown in FIG. 1. The lenses 3 and 4 are spliced together in one unit, and a nosepiece support 13 is attached to the joint 11 between the lenses 3 and 4 through a hinge 12. A nosepiece 15 is attached to the distal end of the support 13 through a hinge 14. The nosepiece 15 has a structure in which a flexible metallic core is coated with a non-rigid plastic material so that the nosepiece 15 can readily be shaped in conformity with the shape of the bridge of the nose of each individual user. The support 13 has a bent portion 13a at its intermediate portion so that the supported position of the binocular magnifier 10 can readily be changed by adjusting the angle at which the portion 13a is bent.

Bows 18 and 19 are attached to the outer side edges of the lenses 3 and 4 through hinges 16 and 17, respectively. The bows 18 and 19 are designed to be foldable through hinges 20 and 21 so that the binocular magnifier 10 is portable and convenient for accommodation.

The nosepiece support 13 and the lenses 3, 4 may be connected through a snap action mechanism if desired. In this case, the mechanism is preferably arranged to limit the range within which the support 13 is movable in order to prevent the support 13 from damaging the lenses 3 and 4 when it is folded.

Figure 6:
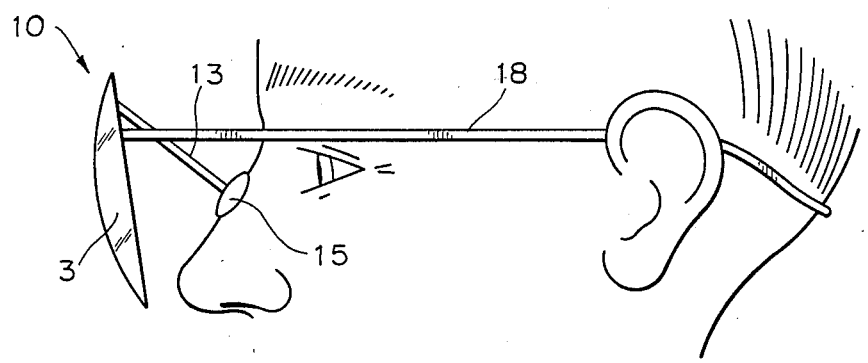
FIG. 6 is a side view of the binocular magnifier according to the present invention in a used state.

Referring now to FIG. 6, which shows the binocular magnifier 10 in a used state, the magnifier 10 is supported in such a manner that the nosepiece 15 is placed on the medium line of the bridge of the user's nose and the intermediate portions of the bows 18 and 19 are placed on the auricles, respectively. Further, the end portions of the bows 18 and 19 are placed on the lower side of the curved portion of the back of the user's head in such a manner that said end portions hold the curved portion of the head. By placing the nosepiece 15 on the median line of the bridge of the user's nose, it is possible to use this magnifier 10 together with an ordinary pair of glasses for correcting the eyesight.

As has been described above, it is possible according to the binocular magnifier of the present invention to ensure a wide field of view and enable the process of binocular vision, from vergence and accommodation to fusion, to be performed considerably smoothly. Accordingly, even if the binocular magnifier is used for a long period of time, there is no fear of the eyes becoming fatigued. Thus, it is possible to obtain excellent binocular vision.

Since the lenses are disposed eccentrically, it is possible to effect vergence without any uncomfortableness even when lenses having a relatively high refracting power are used.

Although the present invention has been described through specific terms, it should be noted here that the described embodiment is not necessarily limitative and various changes and modifications may be imparted thereto without departing from the appended claims.

What is claimed is:

1. A binocular magnifier for weak-sighted persons comprising:

a meniscus convex lens for the right eye retained in front of the right eye, said lens for the right eye having a satisfactorily large diameter to ensure a wide field of view, said lens for the right eye being disposed eccentrically in such a manner that the optical axis of said lens is parallel to the visual axis of the right eye in the short-distance working region and located on the side of said visual axis which is closer to the left eye;

a meniscus convex lens for the left eye retained in front of the left eye, said lens for the left eye having a satisfactorily large diameter to ensure a wide field of view, said lens for the left eye being disposed eccentrically in such a manner that the optical axis of said lens is parallel to the visual axis of the left eye in the short-distance working region and located on the side of the visual axis of said left eye which is closer to the right eye; and said two meniscus convex lenses being spliced together in one unit at the median position between the right and left eyes.

2. A binocular magnifier according to claim 1, wherein the amount of eccentricity of the optical axes of said lenses is in the range of ½ to ⅓ of the calculated value obtained from the following formula:

$$\tan \delta = hD/1000$$

where
- $\delta$: angle of deflection (unit: degree)
- $h$: amount of eccentricity (unit: millimeter)
- $D$: refracting power of lens (unit: diopter).

3. A binocular magnifier according to claim 1 or 2, wherein said two meniscus convex lenses are retained by foldable bows which are attached to said lenses, respectively, and a nosepiece which is attached to the joint between said meniscus convex lenses through a nosepiece support.

4. A binocular magnifier according to claim 1 including means for support of the meniscus convex lenses comprised of a pair of bows connected to said lenses, a nosepiece, and a nosepiece support attached to a joint between said lenses, said nosepiece support having a length sufficient to dispose the lenses in front of an ordinary pair of glasses.

* * * * *